March 4, 1941.   J. H. O'NEIL   2,233,549
SIDE SEAM FOR CAN BODIES
Filed Sept. 9, 1935
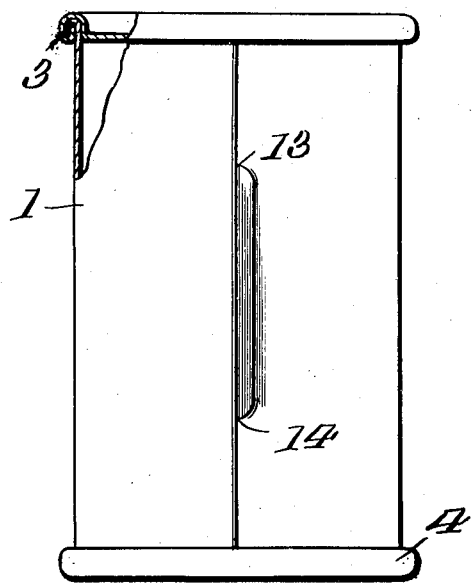
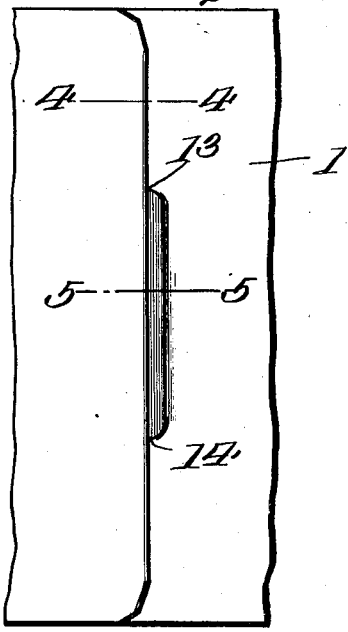
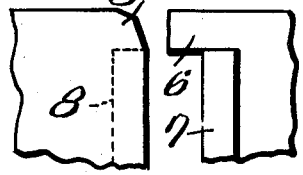
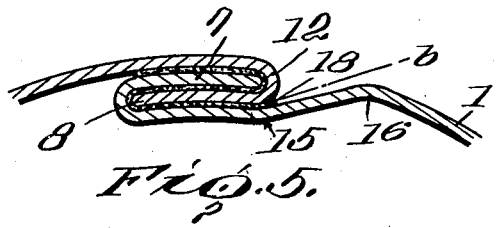
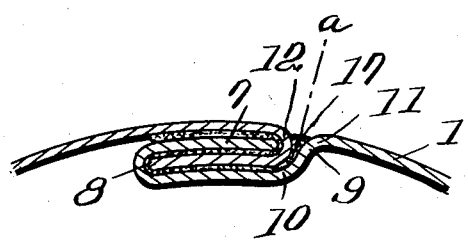
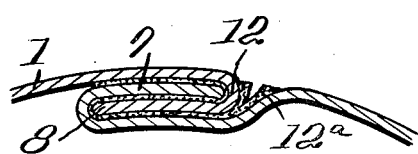
Inventor
James H. O'Neil
By Mason & Porter
Attorneys Patented Mar. 4, 1941

2,233,549

UNITED STATES PATENT OFFICE 2,233,549

SIDE SEAM FOR CAN BODIES

James H. O'Neil, Syracuse, N. Y., assignor to Continental Can Company, Inc., New York, N. Y., a corporation of New York Application September 9, 1935, Serial No. 39,842

2 Claims. (Cl. 220—75)

The invention relates to new and useful improvements in a side seam for can bodies and more particularly to a side seam of the lock and lap seam type.

An object of the invention is to provide a lock and lap seam which is so constructed that the rupturing stress on the solder bond throughout the central region intermediate the ends of the side seam when the can is subjected to excessive internal pressure, is a shearing stress.

In the drawing—

Figure 1 is a view in side elevation of a can embodying the invention, a portion of the can being broken away to show the connection between one of the ends and the body of the can;

Fig. 2 is a side view of a portion of the edge portions of the body blank before they are engaged;

Fig. 3 is an enlarged sectional view of a portion of the can body before the ends are attached thereto;

Fig. 4 is a sectional view on the line 4—4 of Fig. 3;

Fig. 5 is a sectional view on the line 5—5 of Fig. 3, and

Fig. 6 is a view similar to Figure 4 but showing the solder fillet ruptured.

In the usual form of lock and lap seam, the seam is at the inside of the can body, and the body wall is bent outwardly at the base of the outer hook so that it lies close to said hook base. This is accomplished during the bumping operation by the shape of the spline in the bumping anvil. One of the purposes of this shaping of the body wall adjacent the base of the outer hook is to hold said hooks in interlocked position until they are solder bonded. When the body wall is shaped in the manner specified, the solder bond extends well around the base of the outer hook and a solder fillet is formed adhering to the base of the hook and the adjacent portion of the body wall.

It is often desirable to treat products in the cans after the can is sealed and during the treatment an internal pressure is created within the can which imposes a tangential tension stress on the side seam. The ends of the can are double-seamed to the can body and will resist the forces tending to expand the can body in the region adjacent each end. The weakest portion of the side seam is in the region centrally of the length of the side seam. Excessive internal pressure will cause the side seam to bow outward and impose a tension pull on the side seam. This tension pull on the solder fillet is only resisted by the tension resistance of the solder and it often ruptures. The rupturing of the solder fillet weakens the solder bond and permits further expansion of the can body in the central region thereof and a final destruction of the side seam.

Applicant has found that if the can body is shaped at the base of the outer hook so that it curves gradually outward and merges into the peripheral circumference of the can body at a point distant from the base of the outer hook, then the solder bond will terminate substantially at the lower side of the base of the outer hook and the entire solder bond will be under a shearing strain when the can body is subjected to internal pressure rather than a tension strain, which will greatly increase the strength of the side seam.

In the illustrated embodiment of the invention, the can body is indicated at 1. A top end 2 is secured thereto by a double seam 3. The bottom end is also secured to the can body by a double seam 4. The body 1 is formed from a blank of sheet metal which is cut to shape, notched and then bent to provide hooks. The body blank is formed with a flat section 5 which overlies a flat section 6 at each end of the side seam, and this forms the lap sections of the side seam. The metal at one end of the blank is bent back to form a hook 7, and at the other edge of the blank, the metal is bent back to form a hook 8. The hook 7 is the inner hook, as it is carried by the inner lapping section, and the hook 8 is the outer hook, as it is carried by the outer lapping section.

The can body blank is curved about a mandrel and the hooks interlocked, after which the mandrel is expanded to draw the hooks into full engagement and then a bumping hammer contacts with the seam for bringing the hooks into close engagement and for shaping the metal in the region adjacent the base of the outer hook 8. This member which shapes the can body in the region of bumping is referred to as a spline. In carrying out the present invention, the spline is so shaped that the wall of the can body in the regions adjacent each lap section of the side seam is bent outwardly so that it lies close to the base of the outer hook 8. Fig. 5 is a section through this portion of the side seam. The body wall in the region indicated at 9 is curved outwardly from a point 10 and merges into the outer peripheral line of the can body substantially at the point 11. The body wall between the points 10 and 11, lies close to the base 12 of the hook 8.

The spline is cut away so as to give a new shaping to the body wall from the point 13 to the point 14, as viewed in Fig. 3. In this region, which is the central region of the length of the side seam, the body wall from the point 15 adjacent the base 12 of the outer hook 8 curves gradually outward and merges into the peripheral circumference of the can body at the point 16 (see Fig. 5).

When the side seam constructed in the above manner is solder bonded, the solder will form a very small fillet 18 in this region between the points 13 and 14, which fillet is located at the extreme inner portion of the base of the hook 8. The center line $b$ of this fillet is nearly tangent to the can body and the tangential stress on the fillet due to internal pressure on the can body is a shearing stress and not a tension stress. It is well known that the shear resistance of solder is several times greater than the tension resistance. In the regions between the ends of the side seam and the points 13 and 14, respectively, the solder will form a fillet 17 which terminates close to the outer peripheral circumference of the can body. The center line $a$ of the fillet is nearly radial of the can body and the fillet is subjected to a tension stress which will rupture said fillet as indicated at 12a in Fig. 6, if the stress exceeds the tensional strength of solder.

As has already been noted, the double-seaming of the can ends to the body aids the solder bond to resist internal expanding forces on the can body. This added resistance from the double seam gradually diminishes toward the center of the length of the seam.

Applicant has found that with the body wall shaped as described, much greater strength is given to the side seam in the region centrally of the length of the seam. The double seams give sufficient added strength to the solder bond in the regions adjacent the end of the side seam and, therefore the body wall can be shaped in these regions so as to hold the hooks interlocked for solder bonding.

In the can body above described, a side seam is provided which has all the advantages of the usual lock seam in constructing the can body, and wherein the side seam has a much greater resistance to the rupturing stresses when subjected to internal pressure.

While the invention as illustrated shows a shaping of the metal of the can body so as to impose a shearing strain on the solder fillet in the central region of the length of the side seam only, it will be understood that this shaping of the wall of the container may extend from one end of the hooks to the other with advantage, as it increases the resistance offered by the solder fillet to the rupturing strain imposed thereon when the can body is subjected to excessive internal pressure.

Having thus described the invention, what I claim as new and desire to secure by Letters Patent is:

1. A side seam for can bodies comprising a body blank bent into cylindrical form and having the edges joined in a side seam disposed within the outer peripheral line of the can body, said side seam including interlocking hooks extending from one end of the can body to the other and a solder-bond uniting said hooks, the body wall of the can body carrying the inner hook in the portions of the side seam adjacent the ends thereof being curved so as to merge into the body wall close to the base of the outer hook and in the portions of the side seam adjacent the central region being gradually curved outwardly and merging into the peripheral line of the can body at a sufficient distance from the base of the outer hook so that the solder-bond terminates at the inside of the base of the outer hook whereby the stress on the solder fillet in said central region of the side seam, due to internal pressure within the can body, is a shearing stress.

2. A side seam for can bodies comprising a body blank bent into cylindrical form and having the edges joined in a side seam disposed within the outer peripheral line of the can body, said side seam including interlocking hooks and a solder-bond uniting said hooks, the body wall of the can body carrying the inner hook in the portions of the side seam adjacent the ends thereof being curved so as to merge into the body wall close to the base of the outer hook and in the portions of the side seam adjacent the central region being gradually curved outwardly and merging into the peripheral line of the can body at a sufficient distance from the base of the outer hook so that the solder-bond terminates at the inside of the base of the outer hook whereby the stress on the solder fillet in said central region of the side seam, due to internal pressure within the can body is a shearing stress.

JAMES H. O'NEIL.